United States Patent
Boeckle

(10) Patent No.: US 8,810,148 B2
(45) Date of Patent: Aug. 19, 2014

(54) SURGE-PROOF INTERFACE CIRCUIT

(75) Inventor: Reinhard Boeckle, Mäder (AT)

(73) Assignee: Tridonic GmbH and Co. KG, Dornbim (AT)

( * ) Notice: Subject to any disclaimer, the term of this patent is extended or adjusted under 35 U.S.C. 154(b) by 30 days.

(21) Appl. No.: 13/695,315

(22) PCT Filed: May 2, 2011

(86) PCT No.: PCT/EP2011/056943
§ 371 (c)(1),
(2), (4) Date: Dec. 13, 2012

(87) PCT Pub. No.: WO2011/135098
PCT Pub. Date: Nov. 3, 2011

(65) Prior Publication Data
US 2013/0200803 A1    Aug. 8, 2013

(30) Foreign Application Priority Data

Apr. 30, 2010  (AT) ................................ GM281/2010
Apr. 30, 2010  (DE) ..................... 20 2010 006 269 U

(51) Int. Cl.
H05B 37/00    (2006.01)
H05B 39/00    (2006.01)
H05B 41/14    (2006.01)

(52) U.S. Cl.
USPC ............ 315/289; 315/119; 315/127; 315/290

(58) Field of Classification Search
None
See application file for complete search history.

(56) References Cited

U.S. PATENT DOCUMENTS

| | | | | |
|---|---|---|---|---|
| 4,396,882 A | * | 8/1983 | Kellenbenz | 323/278 |
| 6,118,259 A | * | 9/2000 | Bucks et al. | 323/312 |
| 6,192,125 B1 | | 2/2001 | Norsworthy et al. | |
| 6,445,144 B1 | | 9/2002 | Wuidart et al. | |
| 6,714,645 B1 | * | 3/2004 | Sacca et al. | 379/399.01 |
| 8,312,347 B2 | * | 11/2012 | Hick et al. | 714/758 |

FOREIGN PATENT DOCUMENTS

| | | |
|---|---|---|
| DE | 101 13 367 C1 | 1/2003 |
| FR | 2 495 866 A1 | 6/1982 |
| JP | 1 208094 A | 8/1989 |
| JP | 1 300661 A | 12/1989 |

OTHER PUBLICATIONS

International Search Report issued in connection with the corresponding International Application No. PCT/EP2011/056943 on Oct. 12, 2011.

* cited by examiner

*Primary Examiner* — Anh Tran
(74) *Attorney, Agent, or Firm* — The H.T. Than Law Group

(57) ABSTRACT

In examples of the embodiment, a surge-proof interface circuit (100) comprises a rectifier circuit (20) which is configured to produce a rectified rectifier output voltage at the rectifier output terminals (20c, 20d), in accordance with a rectifier input voltage at the rectifier input terminals (20a, 20b), and a Darlington circuit (30) which comprises at least two transistors (Q3, Q4). Said Darlington circuit (30) comprises a current path (35) which can be controlled on the output side in accordance with a control signal (62) and said current path (35) which can be controlled on the output side is coupled between the rectifier output connections (20c, 20d).

19 Claims, 7 Drawing Sheets

SURGE-PROOF INTERFACE CIRCUIT

BACKGROUND OF THE INVENTION

The present invention relates to a surge-proof interface circuit such as is used in electronic devices such as, for example, in ballasts for lighting means. Via the interface circuit, data and/or control commands can be exchanged between a control unit for the lighting means and a ballast for lighting means.

Such interface circuits are generally frequently encountered where different electronic switching arrangements, for example via a bus system or signal lines, are connected. In this context, it may be the case that the electronic circuits coupled via the interface circuit operate with differently high operating voltages. In the case of ballasts for lighting means, for example, the ballast can have, on the one hand, a high operating voltage for operating the lighting means but, on the other hand, electronic circuit parts, for example for controlling the brightness of the lamp, can be connected to a bus or signal line system at which a relatively low voltage can be present in comparison with the operating voltage of the lighting means.

Nowadays, interface circuits are commonly used which can receive and process both digital signals such as DALI and line-voltage-oriented signals such as, for example, via a push button connected to the line voltage.

Since, during the installation of such illumination systems, mistakes may arise in the connecting lines or else overvoltages and voltage pulses on the bus system during operation, it would be desirable to use a surge-proof interface circuit having a high dielectric strength. For example, when operating a push button at the signal lines, connected to the line voltage, voltage pulses can arise at the interface circuit due to so-called key bounce or due to switching processes with relatively large load inductances, caused by transformers, chokes etc. which are coupled to the bus or signal lines. It is desirable, therefore, to create a surge-proof interface circuit so that the interface circuit will not be destroyed even in cases of inattention during the electrical installation or else due to other voltage pulses which may arise in the bus system.

An interface circuit having a fast overvoltage detector which is formed by a zener diode and a switching transistor is disclosed in patent specification DE 101 13 367 C1.

Other interface circuits according to the prior art frequently use a thyristor in order to secure dielectric resistance. FIG. 7 shows such an interface circuit having a thyristor in a circuit diagram.

The interface circuit 10 in FIG. 7 has connecting terminals 1 for signal lines or a bus system, respectively. The signal lines are coupled to the remaining interface circuit via a rectifier circuit which is formed by four diodes D1 to D4 in a Graetz circuit arrangement. The dielectric strength of the interface circuit 10 is secured via the thyristor X11. The thyristor X11 is connected in series with a transistor Q34. Furthermore, the interface circuit comprises optocouplers U7 and U8 and a constant-current source which is formed by the transistors Q2, Q20 and the resistors R31 and R34. The optocouplers U7 and U8 are coupled to a microprocessor, which is indicated by the symbol μC, so that data and control commands can be transmitted via the interface circuit 10 between the terminals 1 and the microprocessor which is connected at the points designated by μC. The optocoupler U7 controls in the return channel switch Q34 which is arranged in series with the thyristor X11. The switch Q34 is constructed as a low-voltage switch, whereas the thyristor, as already mentioned above, is intended to secure the dielectric resistance of the circuit. Transmission from the microprocessor to the terminals 1 via the interface circuit 10 occurs due to the fact that the switch Q34 is controlled via the optocoupler U7. When the switch Q34 is switched on, that is to say turned on, the potential at the cathode of thyristor X11 is pulled to a low potential. If then a voltage is present at terminals 1, the thyristor is turned on and the node 5 at the rectifier circuit is pulled in the direction of a ground potential. In other words, a low-resistance connection is established between the connecting terminals 1. As a result, a signal can be transmitted via the bus system when a voltage is present at terminals 1. Turning the thyristor X11 on takes place since a voltage is present at the gate, on the cathode side, of the thyristor over the path with respect to resistor R101 and R100, which voltage is higher than at the cathode of the thyristor.

If then, for example, the interface circuit 10 is switched to a line voltage, for example via a push button or switch, on sides of the terminals 1, key bounce can produce relatively narrow or short-time interference pulses up to the kilovolt range. These voltage pulses are called so-called signal sequence or burst pulses and, in the case of a corresponding dielectric strength of a circuit, this is called burst strength. The burst pulses are fast transient disturbance variables which are coupled in the power supply or in the signal inputs. These burst pulses can be distinguished by a short repetition rate and a low energy of the short-time disturbance. These burst pulses can easily also lead to a destruction of the interface circuit if no protective circuit such as, for example, a filter circuit is provided.

If, however, greater (load) inductances such as, e.g., transformers, chokes etc. are coupled to the terminals 1 via a control line and these are switched, high-energy overvoltage pulses or surge pulses having voltages also up to the kilovolt range can be produced. The surge pulses are high-energy transient voltage pulses which become noticeable as transient overvoltages or surge voltages such as can be produced during switching actions in the corresponding lines.

To filter or attenuate these burst or surge pulses, a filter can be connected ahead of an interface circuit. The filter can be dimensioned in such a manner that burst pulses of up to a voltage increase of some 10 volts are eliminated. However, this can be more difficult in the case of the surge pulses. Although these can be typically reduced greatly in the voltage amplitude by the filter, a 2 kV voltage pulse having an amplitude of, for example, 1 kV can nevertheless still reach the interface circuit. When a thyristor of the prior art is used, the thyristor can now be turned on wholly or partially by a steep edge of such a surge pulse since the thyristor is a positively coupled element. The "ignition" of the thyristor can then lead to the immediate destruction of the downstream transistor Q34 which, as a consequence of the current gain needed, can be a transistor of a low-voltage type with a dielectric collector-emitter strength of, for example, 45 to 80 volts. During this destruction process, the thyristor X11 is then finally turned on completely and can then also be destroyed. Although this turning-on or breakover of the thyristor can be influenced somewhat by circuit measures by connecting, for example, a capacitor directly from the gate to the cathode of the thyristor, the breakover can often not be adequately suppressed. The thyristor X11 is then in most cases destroyed not as a consequence of a high voltage but as a consequence of power overload.

SUMMARY OF THE INVENTION

Considering the above statements, it is therefore desirable to create a surge-proof interface circuit with a high dielectric strength and low circuit expenditure which avoids the disadvantages described above.

It is the object of the present invention, therefore, to create an interface circuit having an improved dielectric strength and a relatively simple circuit implementation.

This object is achieved by the surge-proof interface circuit according to the invention as claimed in protective claim 1, and by the ballast with interface circuit as claimed in claim 16 and the illumination system for lighting means as claimed in protective claim 17.

Advantageous developments of the invention are then specified in the subclaims.

A core concept of the present invention consists in creating a surge-proof interface circuit with the aid of a Darlington circuit, wherein a high dielectric strength can be achieved in a relatively simple manner in relation to circuits by using surge-proof transistors, the price of which is better compared with a thyristor and which can also have adequate current gain, in order to provide for certain signal levels at an input of the interface circuit in dependence on a drive signal.

BRIEF DESCRIPTION OF THE DRAWINGS

Preferred exemplary embodiments of the invention will be explained in greater detail in the text which follows, while referring to the attached drawings, in which.

DETAILED DESCRIPTION OF THE INVENTION

With respect to the following description of the exemplary embodiments of the present invention, it should be noted that, in the different figures, the same reference symbols are used for functionally identical or identically acting or functionally equal equivalent elements or steps for the purpose of simplification in the entire description. These elements having the same reference symbols are thus interchangeable with one another in the various exemplary embodiments.

Figure 1:
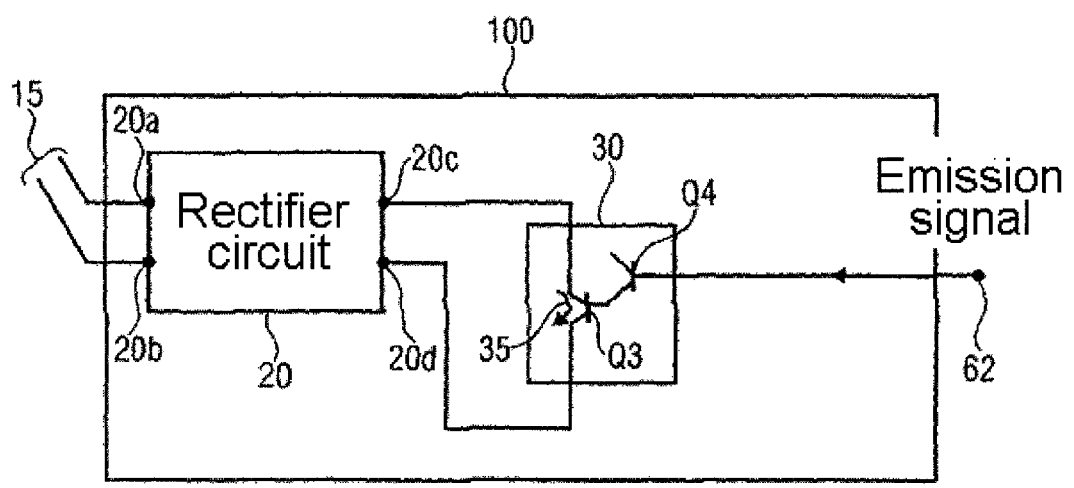
FIG. 1 shows a diagrammatic representation of a surge-proof interface circuit according to one exemplary embodiment of the present invention.

FIG. 1 shows a schematic block diagram of a surge-proof interface circuit 100 according to one exemplary embodiment of the present invention. The surge-proof interface circuit 100 has a rectifier circuit 20 which is designed for providing, in dependence on a rectifier input voltage present at rectifier input terminals 20a, 20b, a rectified rectifier output voltage at rectifier terminals 20c, 20d. Furthermore, the surge-proof interface circuit 100 has a Darlington circuit 30 having at least two transistors Q3 and Q4, wherein the Darlington circuit 30 has a current path 35 on the output side, controllable in dependence on a drive signal 62. The controllable current path 35 on the output side is coupled between the rectifier output terminals 20c and 20d. Furthermore, the controllable current path 35 on the output side is designed for forming between the rectifier output terminals 20c and 20d an electrical load variable in dependence on the drive signal 62. That is to say, depending on the drive signal, the Darlington transistor 32 can turn on with the controllable current path 35 on the output side, so that the rectifier output terminals 20c and 20d are at least approximately "short circuited". Depending on the drive signal 62, the rectifier output terminals 20c and 20d can thus be connected via the Darlington circuit 30 to have a low impedance in the sense that with a predetermined voltage across the controllable current path on the output side a comparatively large current flows through the controllable current path 35. If a voltage source having a certain internal impedance is connected to the bus system 15, a first signal level having a low voltage can be generated at the rectifier input terminals by means of this "short circuit". By means of the drive signal 62, the Darlington circuit can thus be turned on so that, if a voltage is present at the rectifier input terminals, a comparatively large current can flow, which then leads to a rectifier input voltage being generated at the rectifier input terminals 20a and 20b which corresponds to a first signal level.

Depending on the drive signal 62, the Darlington circuit 30 can also be driven in such a manner that the rectifier output terminals 20c and 20d are only connected with high impedance or very high impedance via the Darlington circuit and thus via the controllable current path 35 on the output side, which is inactive in this case, and therefore no "short circuit" or voltage dip takes place at the rectifier output terminals and thus at the rectifier input terminals. A voltage present at the rectifier input terminals 20a and 20b thus remains on a second signal level which corresponds to a second state of a digital information transmission.

If, for example, the voltage or signal lines 15, which are connected to the rectifier input terminals 20a and 20c of the surge-proof interface circuit 100, are a digital addressable lighting interface (DALI) bus system such as is used in the field of illumination engineering, a first signal level can correspond to a physical Low level having a voltage range from −4.5 V to +4.5 V, whereas a second signal level can be associated with a High level having a voltage range from +9.5 V to +22.5 V, that is to say, e.g., 16 V, or from −9.5 V and −22.5 V. In principle, the data transmission operates in a DALI bus system in such a manner that, in the case of a transmission of one bit, the voltage on a corresponding data line is pulled to zero volts, for example with reference to a reference data line, or at least approximately to zero volts, whereas in the idle state, that is to say if no bit is transmitted, a voltage in the voltage interval from 9.5 to 22.5 V, that is to say, e.g., 16 V or between −9.5 V and −22.5 V, is present on the corresponding data line. In a DALI bus system, data and/or control commands are thus transmitted by an active low-level transmission. Naturally, it is also conceivable that the surge-proof interface circuit is also designed only for an active-high level transmission as is known, for example, from a digital serial interface (DSI) from illumination engineering.

According to further exemplary embodiments, additional key switch signals or switching signals, that is to say simple pulse signals or DSI signals, that is to say signals according to a digital protocol, can also be coupled to the surge-proof interface circuit via the rectifier input terminals 20a, 20b. These key switch or switching signals can be transmitted via the bus system 15, that is to say a push button is coupled to the line voltage. As soon as the push button is operated, the line voltage is switched through for a short time to the interface input, that is to say to the rectifier input terminals 20a, 20b. The duration of this presence of the line voltage can then be evaluated by a control unit (not shown in FIG. 1), the interface circuit 100 being coupled between this control unit and the bus or line system 15.

Figure 2:
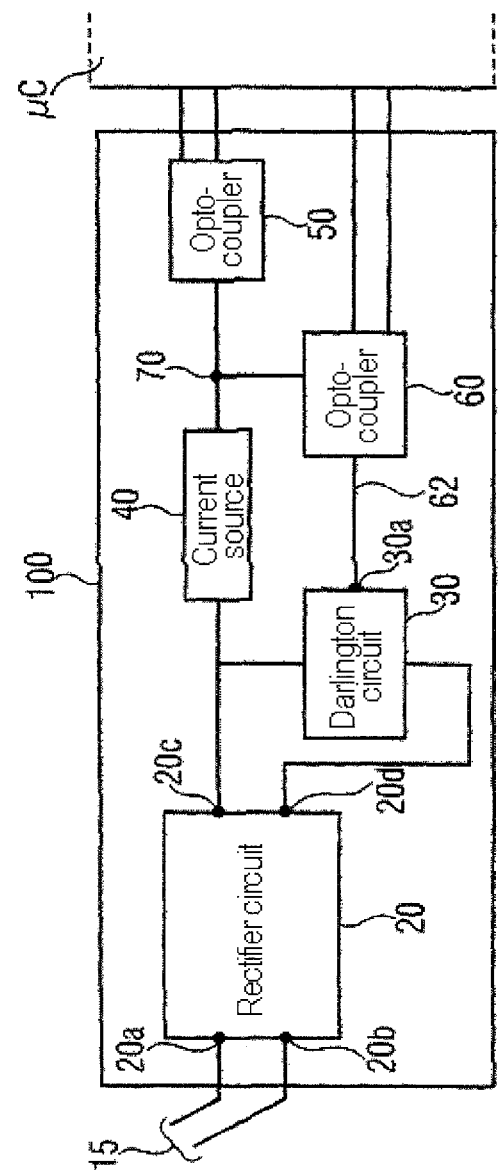
FIG. 2 shows a diagrammatic representation of a surge-proof interface circuit according to a further exemplary embodiment of the present invention.

As is shown in a further block diagram in FIG. 2, the surge-proof interface circuit 100 according to the invention can also have several further optional circuit arrangements. Apart from the rectifier circuit 20 already described in conjunction with FIG. 1 and the Darlington circuit 30, the surge-proof interface circuit 100 can have a current source 40, a circuit arrangement 50 for electrical isolation, which can be designed as an optocoupler, and a second optocoupler 60. The first optocoupler 50 and the second optocoupler 60 can be designed for making possible bidirectional data and/or control signals between a microprocessor µC and the bus system 15, between which the surge-proof interface is coupled. For example, the optocoupler 50 can thus be designed for sending information, which is present at the bus or line system 15, to the microprocessor µC. On the other hand, data and information of the microprocessor µC are received from the surge-proof interface with the aid of the optocoupler 60 and, on the basis of these drive signals 62, the information is transmitted to the bus system or line system 15.

The current source 40 can be designed for providing a drive voltage at the input side to a drive terminal 30a of the Darlington circuit 30 if a signal is to be transmitted via the optocoupler 60 in the direction of the bus system 15 and so that the phototransistor on the output side of the optocoupler 60 is illuminated so that the controllable current path 35 on the output side is turned on. As already explained above in conjunction with FIG. 1, a load between the rectifier output terminals 20c and 20d is thereupon changed. If between the rectifier output terminals 20c and 20d a "short circuit" occurs, it is transferred to the rectifier input terminals 20a and 20b and the voltage on the bus system collapses, which can correspond to a Low level in the transmission protocol between circuits connected to the bus system 15 and the microprocessor. In this manner, the data and/or control commands can be transmitted to the bus system 15.

Figure 3:
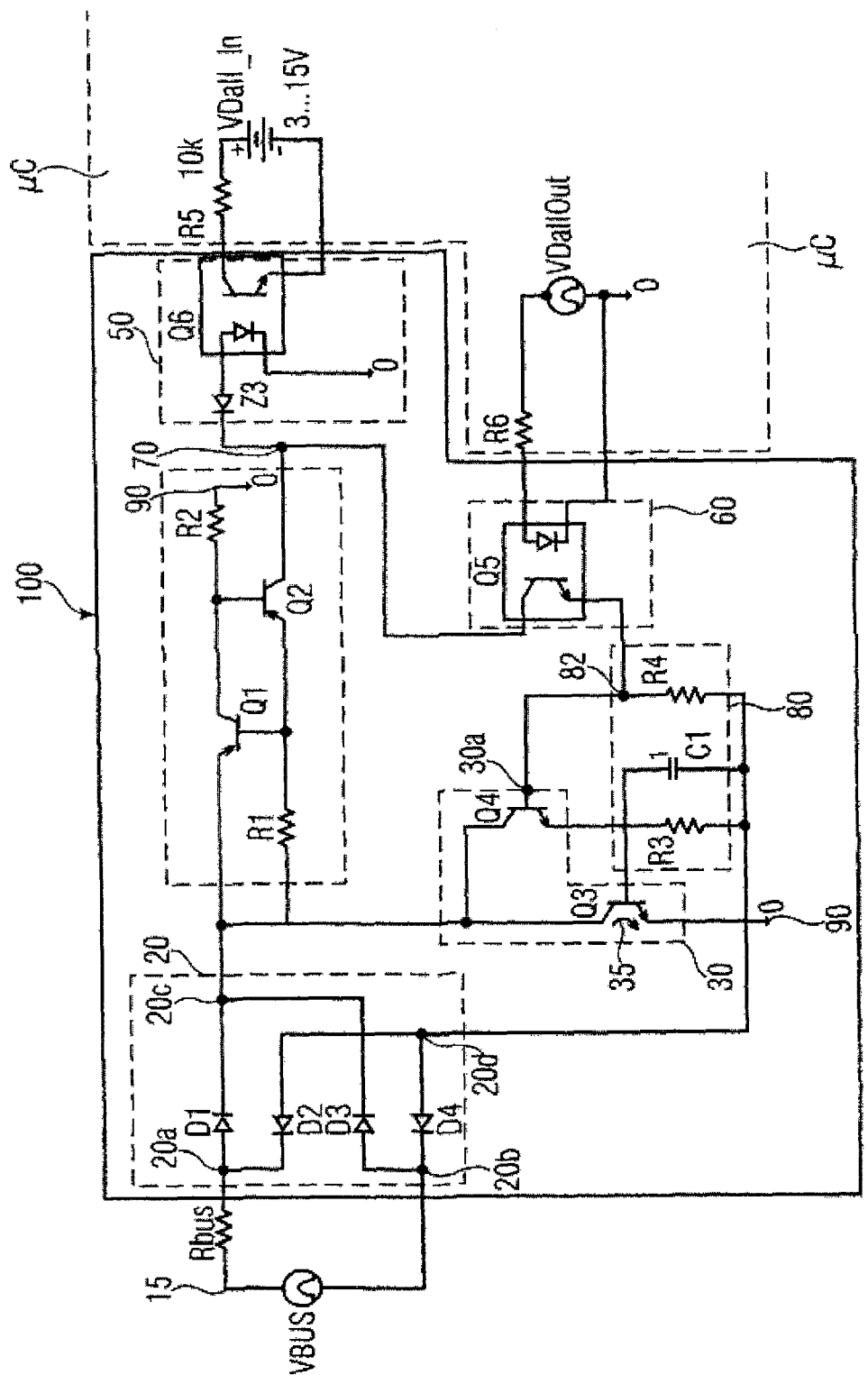
FIG. 3 shows a circuit diagram of a surge-proof interface circuit according to a further exemplary embodiment.

In the text which follows, an exemplary embodiment of the surge-proof interface circuit according to the invention is described in greater detail by means of a circuit diagram in FIG. 3.

The rectifier circuit 20 can be, for example, four diodes D1 to D4 which are interconnected in a Graetz circuit arrangement. A bus system 15 can be couplable to the rectifier input terminals 20a and 20b. The bus system 15 can be, for example, a DALI bus system. As already described above, a rectifier input voltage which corresponds to a High level in the DALI system can be present at the rectifier input terminals 20a and 20b in an idle state of the bus system. Correspondingly, a rectified rectifier output voltage is then provided at terminals 20c and 20d of the rectifier 20. Between the rectifier output terminals 20c and 20d, the Darlington circuit 30 can then be coupled with its least two transistors Q3 and Q4 so that a controllable current path 35, on the output side, of the Darlington circuit, which acts as current amplification circuit, is coupled between the rectifier output terminals. In this exemplary embodiment, the transistors Q3 and Q4 are designed as npn-type bipolar transistors. The bipolar transistor Q4 on the input side is coupled in this exemplary embodiment with its collector terminal to the rectifier output terminal 20c and with its emitter terminal to the base of the transistor Q3 on the output side. The corresponding base for controlling the bipolar transistor Q4 is connected via a node 82 to a resistor R4 of the drive circuit 80, which has a resistance value of 10 kΩ and is closed with its second terminal to a ground potential 90, and to the optocoupler Q5. A drive signal 62 can then be applied to the base or control terminal of the transistor Q4 via the optocoupler Q5 and the drive circuit. The transistor Q3 on the output side is connected with its base, on the one hand, via an RC section of the drive circuit 80 to the ground potential 90 and, on the other hand, to the emitter terminal of the transistor Q4. The controllable current path 35 on the output side, that is to say the controllable current path between collector and emitter of transistor Q3, is coupled between the rectifier output terminals 20c and 20d. In this arrangement, the collector terminal of the bipolar transistor Q3 is coupled to the rectifier output terminal 20c and the emitter terminal is coupled to the rectifier output terminal 20d. Both the rectifier output terminal 20d and the emitter terminal of transistor Q3 are both at a reference potential which, in the present exemplary embodiment, can be the ground potential 90. In other exemplary embodiments of the present invention, the Darlington circuit 30 can also have more than two bipolar transistors. In addition, the transistors can also be, for example, field effect transistors such as, e.g., MOS-FET transistors.

In this exemplary embodiment, the Darlington circuit 30 is driven via a drive circuit arrangement 60, 80. The drive circuit arrangement 80 has a resistor R4 with a resistance value of some kΩ which is connected between a drive terminal of the Darlington circuit 30, that is to say, for example, the base terminal of the bipolar transistor Q4, on the input side, of the Darlington circuit and a reference potential conductor 90, wherein the reference potential conductor can be coupled to a terminal, on the reference potential side, of the controllable current path 35 on the output side. The reference potential can be, for example, the ground potential 90. The resistor R4 is designed is for pulling a node 82 in the direction of a ground potential 90 in the idle state, that is to say when no drive signal 62 is present and thus no bit is to be sent to the bus system 15. Furthermore, the drive circuit arrangement 80 has the RC section, already mentioned above, which consists of a resistor R3 having a resistance value in the kΩ range and a capacitor C1 having a capacitance of less than 1 µF. The RC section is connected at one terminal to the base of transistor Q3 and the emitter terminal of transistor Q4 and via its second terminal to the reference potential, that is to say, for example, to the ground potential 90. In order to then improve the dielectric strength of the interface circuit 100 in comparison with the thyristors used in accordance with the prior art (see FIG. 7), the at least two transistors Q3 and Q4 of the Darlington circuit can be surge-proof transistors. For example, the at least two transistors in the Darlington circuit can have a dielectric strength of at least 100 volts, at least 600 volts or at least 1000 volts. For the bipolar transistors Q3 and Q4, a dielectric collector-emitter strength of at least 100 volts, at least 600 volts or at least 1000 volts can be given, for example.

Figure 7:
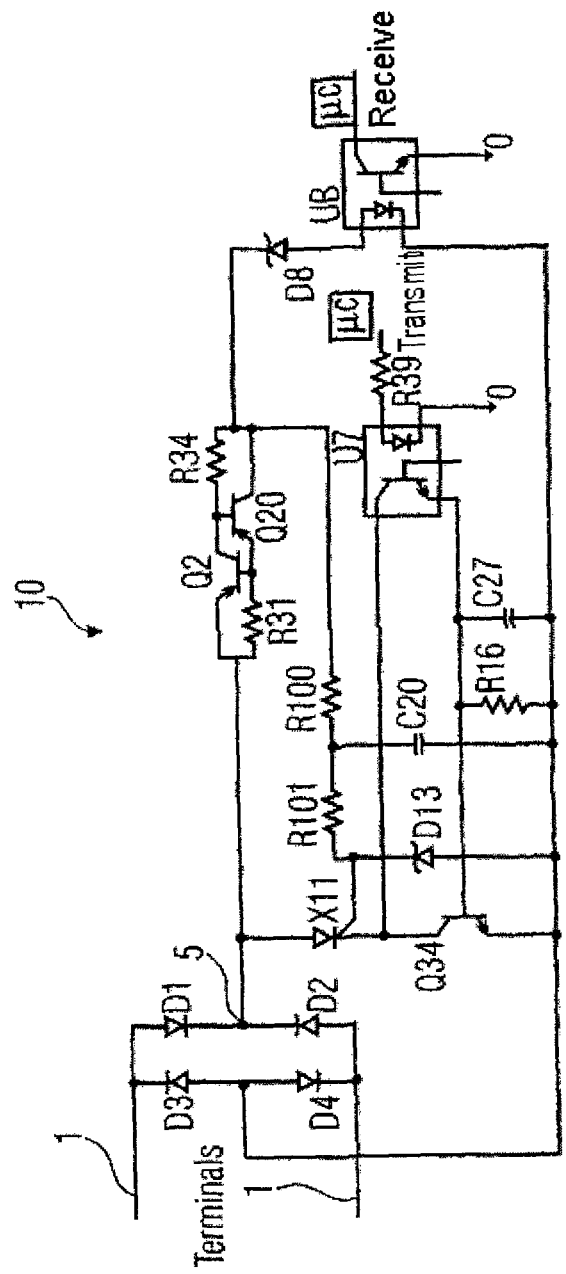
FIG. 7 shows an interface circuit having a thyristor according to the prior art.

According to one exemplary embodiment, the Darlington circuit 30 can comprise surge-proof transistors having a dielectric strength of greater than 600 V. The transistors of the Darlington circuit are preferably selected in such a manner that a current gain of the Darlington circuit is greater than 1500 or greater than 2000, wherein, on the Darlington circuit being turned on, a collector current within a range of 1 mA to 300 mA is available in the controllable current path 35 on the output side. For example, the transistor Q3 can have advantageously a current gain of greater than 80 in a collector current range from 1 mA to 300 mA. The driver transistor Q4 in the Darlington circuit 30 can have a current range for the current gain of, for example, 1 mA to 4 mA. In order to keep a voltage for a Low level in a DALI bus system within the permissible range of the interface voltage for a Low level of ±4.5 V, it may additionally be necessary to connect the resistor R2 of the current source 40 in the input channel of the surge-proof interface circuit to ground in contrast to the resistor R34 of the previous circuit with a thyristor (FIG. 7).

In one exemplary embodiment, the bipolar transistors Q4 and Q3 can thus have together an at least 1500-fold or at least 2000-fold current gain so that, in a turned-on state of the Darlington circuit, a current of between 1 mA and 300 mA is available in the controllable current path on the output side.

Advantageously, one or more capacitors can furthermore be connected at one or at several transistor base terminals or control terminals of the transistors of the Darlington circuit 30 in the surge-proof interface circuit according to the invention. These capacitors can be coupled between the base terminals and, for example, a ground potential 90 and prevent a turning-on of the respective transistors as a consequence of a voltage pulse via the respective Miller capacitances, that is to say the capacitance between the collector terminal and the base terminal. For example, the capacitor C1 of the drive circuit 80 can thus be connected between the base terminal of the transistor on the output side, that is to say, e.g., the bipolar transistor Q3, and a reference potential such as the ground potential 90. As an alternative or additionally, a second capacitor can also be connected between the base terminal of the transistor on the input side, that is to say, e.g., the bipolar transistor Q4, and a corresponding reference potential.

By means of this capacitor C1, the dielectric strength of the surge-proof interface circuit can then be improved significantly. In the exemplary embodiment in FIG. 3, the capacitor C1 is coupled, for example, between the transistor base of the bipolar transistor Q3 and the ground potential 90. The capacitor C1 has in this exemplary embodiment a capacitance value of less than 1 µF which is relatively large compared with a typical Miller capacitance of a bipolar transistor which is in the Pico-Farad range.

In general, the capacitance value of such a capacitor, e.g. of capacitor C1, can be matched to the Miller capacitance of the connected transistor and the desired dielectric strength of the interface circuit 100. The capacitance of a capacitor for increasing the dielectric strength can be, for example, at least 100 times or 200 times as large as the Miller capacitance of a transistor of the Darlington circuit to which the capacitor is coupled for increasing the dielectric strength. For example, a capacitance of the capacitor which is connected to a base or a control terminal of a transistor of the Darlington circuit can be selected in such a manner that a voltage pulse of 500 V, of 1000 V, of 2000 V or even of a higher voltage does not lead to a turning-on of the controllable current path 35 on the output side in the case of an inactive drive signal at the Darlington circuit via the controllable current path 35 on the output side. When a correspondingly dimensioned capacitance is present at a base or control terminal of a transistor of the Darlington circuit, the turning-on of the controllable current path on the output side can is prevented. The surge-proof interface circuit 100 can thus also have in exemplary embodiments at least one capacitor C1 which is coupled to a control terminal of a transistor Q3 and/or Q4 of the Darlington circuit 30 and which is designed for counteracting a change in a controlled current path of the corresponding transistor Q3 and/or Q4.

When using a Darlington circuit, there is advantageously, in comparison with an interface circuit with thyristor, no breakover effect typical of thyristors which leads to a turning-off of the thyristor being less manageable after the "ignition" of the thyristor.

The surge-proof interface circuit 100 can also have a current source 40 which is coupled between the first rectifier output terminal 20c and a node 70. The current source 40 has two pnp-type bipolar transistors Q1 and Q2 and a first resistor R1 having a resistance value of some hundred Ω, and a second resistor R2 having a resistance value of approx. one hundred kΩ. The bipolar transistor Q1 can act as control transistor for the bipolar transistor Q2 since it is coupled via its controllable current path to the base terminal of transistor Q2. The emitter terminal of transistor Q1 and resistor R1 are connected to the rectifier output terminal 20c and a base terminal of transistor Q1 is connected between the further terminal of resistor R1 and the emitter terminal of transistor Q2. The collector terminal of transistor Q1 is coupled, on the one hand, to the base terminal of transistor Q2 and, on the other hand, via resistor R2 to a reference potential such as, e.g., the ground potential 90. Resistor R2 is connected between a reference potential such as, e.g., ground potential 90 and the base terminal of transistor Q2. The collector terminal of transistor Q2 is connected via node 70 to the switching arrangement for voltage limiting 50 and to the optocoupler 60.

Since the second resistor R2 is here connected to the ground potential 90, a base current of transistor Q2 can be decisively increased with low input voltages which can correspond to a Low level at the surge-proof interface circuit 100 because of the voltage across resistor R2, increased by the Zener diode Z3 and the optocoupler voltage of the circuit arrangement 50. The switch arrangement 50 has in this exemplary embodiment namely an optocoupler Q6 and a Zener diode Z3 operated in the reverse direction which is connected with its terminal on the cathode side to the collector terminal of transistor Q2. The anode terminal of Zener diode Z3, in contrast, is connected to an anode terminal of a light-emitting diode of the optocoupler and the corresponding cathode terminal of the light-emitting diode is connected to the reference or ground potential 90.

As is shown in FIG. 3, the current source 40 can be coupled between the first rectifier output terminal 20c and a drive terminal 30a of the Darlington circuit 30. This drive terminal 30a can be, for example, the base or the control terminal of transistor Q4.

In the present exemplary embodiment, the optocoupler 60 is also coupled between the current source 40 and the Darlington circuit 30. If then, for example, an active-Low signal of a DALI protocol is present at the input of the surge-proof interface circuit, that is to say a voltage level between −4.5 V and +4.5 V, a current via the transistor Q2 of the current source 40 and the optocoupler Q5, which can be turned on by a microprocessor following a control signal, should be greater than 150 µA so that the current path 35 on the output side, which can be turned on, of the transistor Q3 of the Darlington circuit 30 can pull a current of approximately 250 mA. This makes it possible to ensure that a bit sent by the microprocessor can be transmitted to the bus system 15 via the rectifier circuit 20.

In this exemplary embodiment, the switch arrangement 50 has an optocoupler Q6 and the Zener diode Z3 which are connected to the current source 40 and the optocoupler Q5 is via node 70. The optocoupler Q6 is used for transferring data or control signals which are present at the rectifier input terminals 20a, 20b to a corresponding control unit or a microprocessor. A light-emitting diode (LED) of an optocoupler can be designed for exciting a photoreceiver, such as, e.g., a phototransistor or a photodiode, of the optocoupler on the basis of the signals present at the rectifier input terminals 20a, 20b. The control unit or the microprocessor, respectively, can be designed for sending and for receiving data and/or control signals bidirectionally via the surge-proof interface circuit 100 in accordance with a DALI protocol.

By means of the circuit arrangement 50 having the optocoupler Q6 which has a light-emitting diode (LED), and having the Zener diode Z3 connected in the reverse direction, voltage limiting can be achieved in the node 70. This is achieved by the defined voltage drop across the Zener diode and the LED. If the optocoupler Q5 is switched through, a defined drive voltage can thus then also be achieved at the drive terminal 30a of the Darlington circuit, namely the base or control terminal of transistor Q4. The base of transistor Q4 of the Darlington circuit is thus protected with respect to a voltage pulse via the input channel, that is to say via the current source 40 and the circuit arrangement 50.

The optocoupler Q6 can be designed for transmitting, as is shown in the circuit diagram in FIG. 3, data and/or control commands according to a DALI protocol to a subsequent microprocessor μC, which can be integrated, for example, in a ballast for lighting means. In return, the optocoupler Q5 can be designed for receiving a drive signal 62 from a microprocessor μC of a ballast and thereupon providing a corresponding digital information item with the aid of the Darlington circuit to the rectifier input terminals 20a, 20b. This digital information can then be forwarded via a bus or line system 15, for example, to a central control unit of an illumination system.

Figure 4:
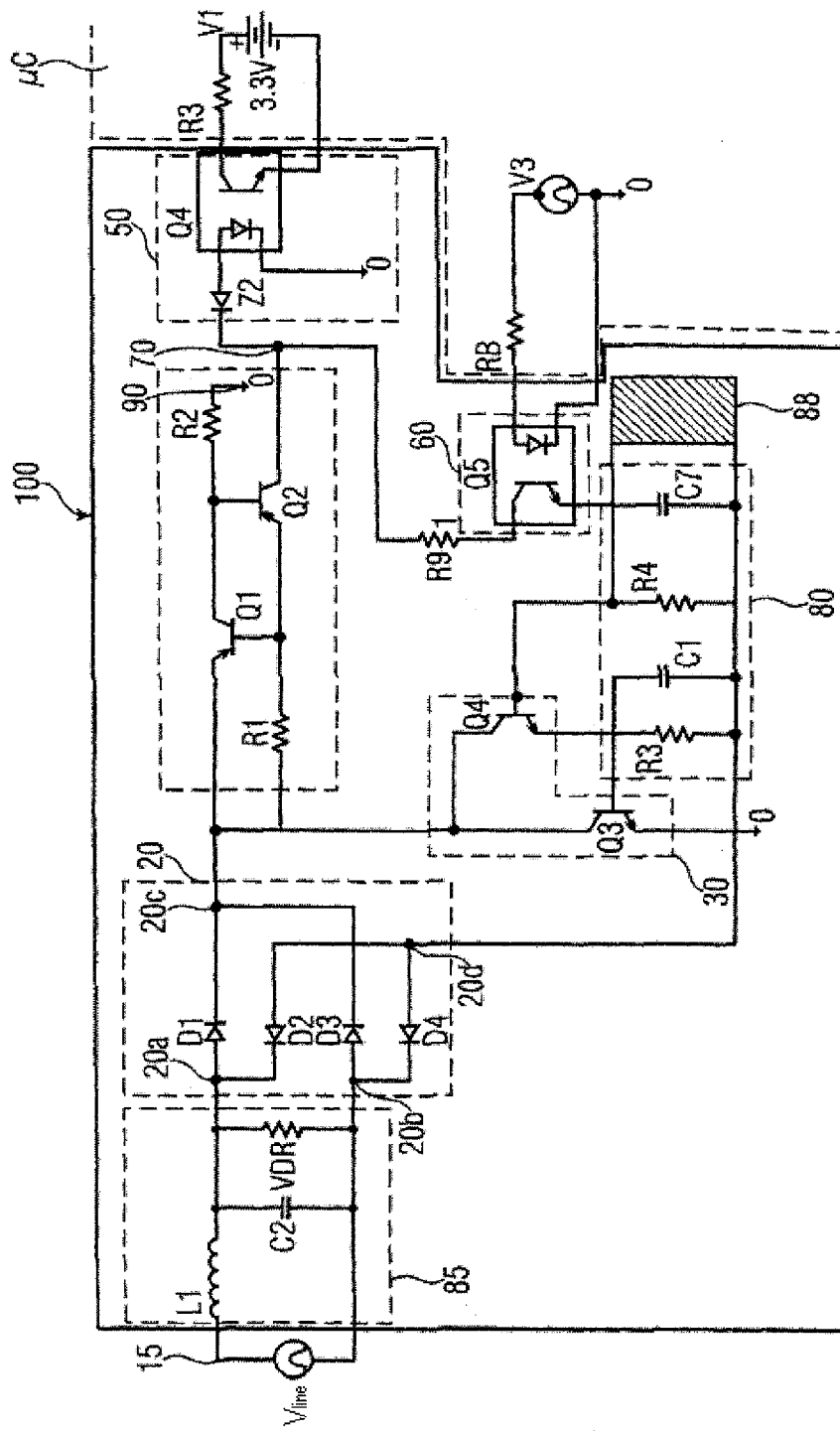
FIG. 4 shows a circuit diagram of a surge-proof interface circuit according to a further exemplary embodiment.

FIG. 4 shows the circuit diagram of a surge-proof interface circuit 100 according to a further exemplary embodiment. The surge-proof interface circuit 100 again has a rectifier circuit 20, a current source 40, a receiving circuit arrangement 50, a Darlington circuit 30 and an optocoupler Q5 as have already been described in conjunction with FIG. 3, which is why these will not be explained again at this point. As is also shown in FIG. 4, the rectifier input terminals 20a and 20b of the surge-proof interface circuit 100 can be preceded by a filter 85. As already explained above, the filter has the purpose of filtering or attenuating voltage pulses such as, e.g., the abovementioned burst or surge pulses. The surge-proof interface circuit 100 can thus also comprise in this exemplary embodiment a filter which filters or attenuates unwanted voltage pulses. In this exemplary embodiment, the filter 85 consists of an inductance L1 having an inductance value of 10 μH, a capacitor C2 having a capacitance of some hundred pF and a 300-V Varistor VDR. The capacitor C2 and the Varistor VDR are here connected as RC section between the rectifier input terminals 20a and 20b whilst the inductance L1 is coupled in series with the RC section and the rectifier input terminal 20a.

The filter 85 can be dimensioned in such a manner that, for example, burst pulses up to a voltage increase of some 10 volts are eliminated. In contrast, this can be more problematic in the case of the high-energy surge pulses in which the voltage increase is not eliminated as severely by the filter. Although surge pulses are reduced greatly in the voltage amplitude by the filter with the Varistor VDR, a surge pulse of, for example, 2 kV can nevertheless still pass to the rectifier input terminals of the interface circuit in spite of the filter 85 with an amplitude of, for example, up to one kV. As has already been mentioned above, an interface circuit with a thyristor of the prior art would then turn on completely or partially due to the steep edge of such a surge pulse since the thyristor is a positively coupled element. This may lead to the destruction of the circuit.

Due to the use, according to the invention, of the Darlington circuit having surge-proof transistors in an interface circuit 100 and due to the use of at least one capacitor which is coupled between a base terminal or a control terminal of a transistor of the Darlington circuit and a reference potential 90, much higher voltage pulses can be applied in comparison with interface circuits with thyristor circuits without the circuit being destroyed. Thus, for example, an interface circuit with a thyristor circuit as has been described in conjunction with FIG. 7 can be destroyed already with a surge pulse of 500 V, whereas, as has been shown in tests, the surge-proof interface circuit 100 with a Darlington circuit can withstand voltage pulses, that is to say, e.g., surge voltages of over 2 kV, without the circuit being destroyed. In addition, the use of 300-V Varistors VDR instead of 275-V Varistors in interface circuits with a thyristor circuit is not really possible since a voltage would be increased correspondingly by using a 300-V Varistor VDR in the filter at the thyristor, which is why, in contrast to the surge-proof interface circuit according to the invention, typically only 275-V Varistors VDR can be used in a thyristor circuit. However, this means that, by means of the surge-proof interface circuit according to the invention, Varistors VDR of greater than 275 V can be advantageously used in the filter 85.

Typically, 300-V Varistors are used at a line input of an electrical ballast for lighting means. From the above statements it is clear that these 300-V Varistors can now advantageously also be used for the filter of a surge-proof interface circuit in the electrical ballast. This results in cost advantages in purchasing the varistors and the production of the ballasts with the interface circuit, and a simplified and faster fitting of the ballasts in production since it is not necessary to use two different varistor types.

In the exemplary embodiment shown in FIG. 4, the control device 80 has, apart from the capacitor C1 which has a capacitance value of some nF, and the resistor R3 having a resistance value in the kΩ range, also a second capacitor C7 with a resistance value of some nF and a second resistor R4 having a resistance value in the kΩ range. The capacitor C1 and the resistor R3 are arranged in parallel between the base or the control terminal, respectively, of transistor Q3 and a reference potential line or a ground potential 90, respectively. In this exemplary embodiment, the capacitor C7 and the resistor R4 are additionally connected to the base or the control terminal, respectively, of the second transistor Q4 of the Darlington circuit 30, preferably in a parallel connection between the base terminal of transistor Q4 and a reference potential line which can be at a ground potential 90. In these exemplary embodiments, a capacitance is thus connected to each transistor base of the Darlington circuit, which capacitance is intended to prevent turning-on of the respective transistor as a consequence of a voltage pulse via its corresponding collector-base capacitances or its Miller capacitances, respectively. By interconnecting the corresponding transistor base terminals of the two transistors of the Darlington circuit to one or more capacitors, it is possible, as has already been explained above in greater detail, to counteract a turning-on of the controllable current path 35 on the output side and thus a possible destruction in the case of overvoltage.

As is shown in the block diagram in FIG. 4, the surge-proof interface circuit can also have a circuit arrangement 88 for adjusting an edge steepness of the signals to be transmitted to the bus system 15.

Figure 5:
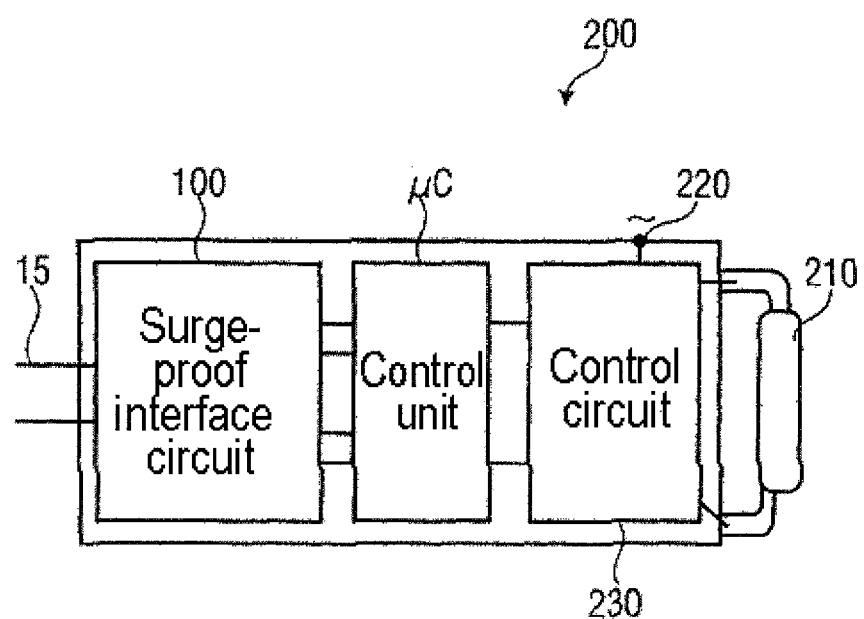
FIG. 5 shows a diagrammatic representation of a ballast for lighting means having a surge-proof interface circuit according to an exemplary embodiment of the present invention.

FIG. 5 then shows diagrammatically an exemplary embodiment of an application of the surge-proof interface circuit 100 according to the invention. According to one exemplary embodiment, an electrical ballast 200 for lighting means 210 can have a surge-proof interface circuit 100 described in conjunction with FIGS. 1 to 4. The lighting means controlled by the ballast can be, for example, an incandescent lamp or a gas discharge lamp. The ballast 200 can also have a control unit or a microprocessor, respectively, or a microcontroller which is designed for controlling the operating state of the lighting means 210 via a control circuit. Such an operating state can be, for example, a certain brightness value of the lighting means 210 to be adjusted. The ballast can have its own voltage supply terminal 220. The lighting means can thus be operated, for example, at 220 V whilst the bus system 15 mentioned above can be operated at a voltage within a range of −22.5 V to +22.5 V. The setting of a particular operating state can be initiated by a control command. This control command can be transmitted by the bus system 15 via the surge-proof interface circuit 100 to the control unit μC which then manages the corresponding driving of a control circuit 230. For example, a control command for setting a particular brightness value can thus be forwarded via the surge-proof interface circuit to the control unit μC of the ballast 200 from a central control unit or a push button or a sensor, which are connected to the bus system 15. This control unit can then initiate, for example, that, by a change of a frequency and/or of a duty ratio, a clocked alternating voltage supplied by an invertor for the lighting means 210 is changed in the control circuit 230 in such a manner that the desired brightness value is set. The line or bus system 15 can be the DALI bus system in which data and/or control commands are transferred in accordance with a DALI protocol. The control unit or the microcontroller μC, respectively, can be designed in such a manner that it can see from the signal pattern of the signals which are supplied to it via the surge-proof interface circuit 100 whether these are, for example, push button signals, that is to say simple pulse signals, or, for example, else digital-serial interface (DSI) signals, that is to say signals according to a certain digital protocol. Depending on the type of data or control commands, respectively, these can then be processed differently.

Figure 6A:
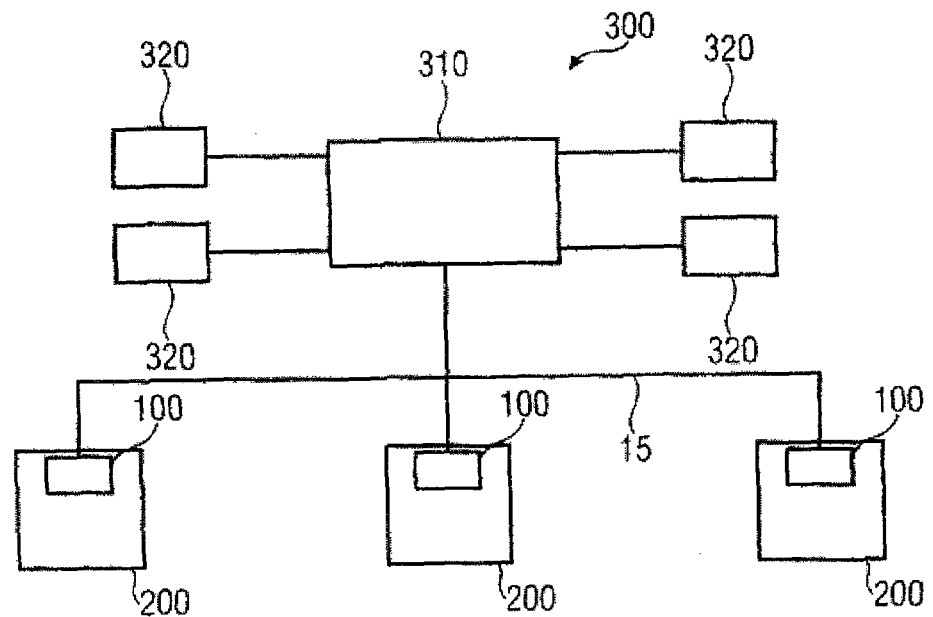
FIGS. 6a-b show illumination systems having ballasts which have a surge-proof interface circuit.
Figure 6B:
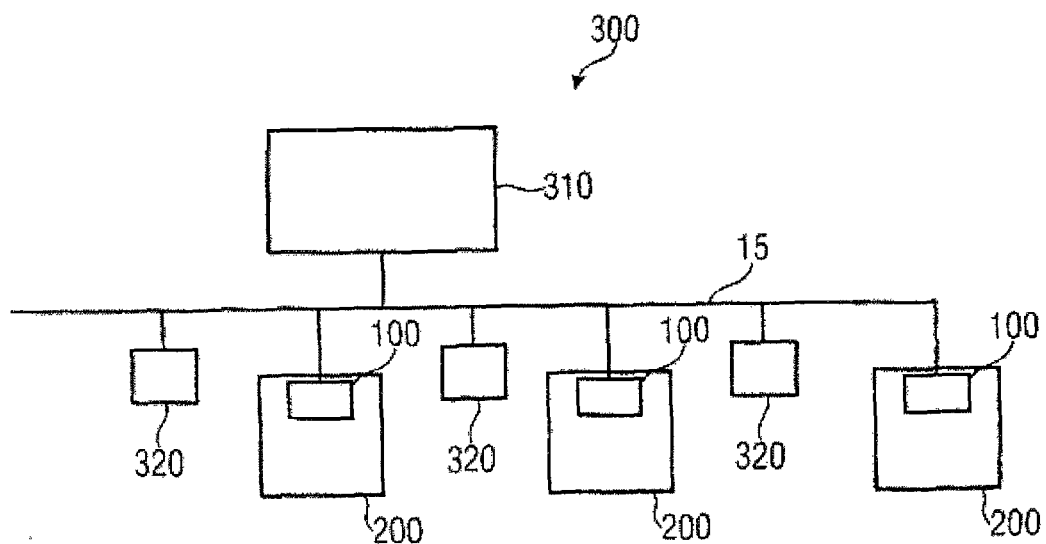

As is shown diagrammatically in FIGS. 6a-b, the invention generally also comprises an illumination system 300 for controlling lighting means with a central control unit 310 which is designed for setting or querying an operating state of a lighting means. The illumination system 300 also has at least one ballast 200 for lighting means, wherein the ballast has a surge-proof interface circuit 100 as has been described in conjunction with FIGS. 1 to 5. The central control unit 310 and the electrical ballast 200 can be coupled electrically to one another via the bus system 15 for the transmission of data and/or control signals. As is described in conjunction with FIGS. 1 to 5, the bus system can be coupled electrically to the interface circuit 100. The bus system 15 can be, for example, a DALI bus system on which data and/or control signals can be transmitted between the central control unit 310 and the ballast in accordance with a DALI protocol. However, it is also conceivable that it is a different bus system. The transmission can be bidirectional, which is why the surge-proof interface circuit 100 can be designed for transmitting corresponding data and/or control signals bidirectionally between a ballast and the central control unit 310.

According to some exemplary embodiments, other elements can also be connected to the bus system for controlling an operating state of a lighting means. These can be, for example, switches, control panels, push buttons, sensors etc. As is shown in FIG. 6a, sensors and operating elements 320 can here be linked directly via separate connections to the central control unit 310 or else the sensors and operating elements 320 can be connected to the central control unit 310 and the ballasts 200 via the DALI bus system 15, as is shown diagrammatically in FIG. 6b.

The invention claimed is:

1. A surge-proof illumination system DALI interface circuit (100) comprising:
a rectifier circuit (20) which is designed for providing, in dependence on a rectifier input voltage present at rectifier input terminals (20a, 20b), a rectified rectifier output voltage at rectifier output terminals (20c, 20d), and
a Darlington circuit (30) having at least two transistors (Q3, Q4), wherein the Darlington circuit has a current path (35) on the output side, controllable in dependence on a drive signal (62), wherein the controllable current path (35) on the output side is coupled between the rectifier output terminals (20c, 20d), and wherein the controllable current path (35) on the output side is designed for forming between the rectifier output terminals (20c, 20d) a load variable in dependence on a drive signal (62).

2. The surge-proof illumination system DALI interface circuit (100) as claimed in claim 1, wherein the surge-proof illumination DALI system interface circuit also has a capacitor (C1, C7) which is coupled to a control terminal of a transistor (Q3, Q4) of the Darlington circuit (30) and which is designed for counteracting a change of a current in a current path of the corresponding transistor (Q3, Q4).

3. The surge-proof illumination system DALI interface circuit (100) as claimed in claim 2, wherein the capacitor (C1, C7) has a capacitance which is at least 100 times as large as a Miller capacitance of the transistor to the control terminal of which the capacitor (C1, C4) is coupled.

4. The surge-proof illumination system DALI interface circuit (100) as claimed in claim 2, wherein a capacitance value of the capacitor (C1, C7) is selected in such a manner that a voltage pulse of 1000 volts across the controllable current path (35) on the output side does not lead to a turning-on of the controllable current path (35) on the output side in the case of an inactive drive signal (62).

5. The surge-proof illumination system DALI interface circuit (100) as claimed in claim 1, which also has a second capacitor (C1, C7) which is coupled to a control terminal of a second transistor (Q3, Q4) of the Darlington circuit (30) and which is designed for counteracting a change of a current in a current path of the second transistor (Q3, Q4).

6. The surge-proof illumination system DALI interface circuit (100) as claimed in claim 1, in which the Darlington circuit (30) has bipolar transistors (Q3, Q4) which have a dielectric collector-emitter strength of at least 500 V, at least 600 V or at least 1000 V.

7. The surge-proof illumination system DALI interface circuit (100) as claimed in claim 1, wherein the Darlington circuit (30) has an at least 1500-fold current gain so that, in a turned-on state of the Darlington circuit (30), a current of between 1 mA and 300 mA is available in the controllable current path (35) on the output side.

8. The surge-proof illumination system DALI interface circuit (100) as claimed in claim 1, which also has a current source (40) which is coupled between a first rectifier output terminal (20c) and a drive terminal (30a) of the Darlington circuit (30), wherein the current source is designed for limiting a drive current of the Darlington circuit.

9. The surge-proof illumination system DALI interface circuit (100) as claimed in claim 8, which also has a node (70) which is electrically coupled between the current source (40), the drive terminal (30a) of the Darlington circuit (30) and a circuit arrangement (50) for voltage limiting.

10. The surge-proof illumination system DALI interface circuit (100) as claimed in claim 9, wherein the node is also coupled to an optocoupler (Q5) for receiving the drive signal (62) and wherein the optocoupler (Q5) is coupled to a drive terminal (30a) of the Darlington circuit (30).

11. The surge-proof illumination system DALI interface circuit (100) as claimed in claim 9, wherein the circuit arrangement (50) for voltage limiting comprises a light-emitting diode (LED) of an optocoupler which is designed for exciting a photoreceiver of the optocoupler on the basis of the signals present at the rectifier input terminals (20*a*, 20*b*).

12. The surge-proof illumination system DALI interface circuit (100) as claimed in claim 8, wherein the circuit arrangement (50) has a Zener diode (Z3) arranged in the reverse direction.

13. The surge-proof illumination system DALI interface circuit (100) as claimed in claim 1, which has a filter (85) preceding the rectifier input terminals (20*a*, 20*b*), and wherein the filter (85) is designed for attenuating voltage pulses reaching the rectifier input terminals (20*a*, 20*b*).

14. The surge-proof illumination system DALI interface circuit (100) as claimed in claim 1, wherein the surge-proof illumination system interface circuit (100) is designed for exchanging control and/or data signals bidirectionally between a control unit (μC), which is coupled to the surge-proof illumination system interface circuit (100) via two optocouplers (Q5, Q6), and a bus system (15), which is coupled to the surge-proof illumination system interface circuit (100) via the rectifier input terminals (20*a*, 20*b*).

15. An electrical ballast for lighting means, comprising a surge-proof illumination system DALI interface circuit (100) as claimed in claim 1.

16. An illumination system (300) for controlling lighting means, having a central control unit (310) for controlling an operating state of lighting means (210) and at least one electrical ballast (200) for lighting means (210) as claimed in claim 15, wherein the central control unit (310) and the electrical ballast (200) for lighting means (210) are coupled electrically via a bus system (15) for the transmission of data and/or control signals.

17. The illumination system (300) for controlling lighting means as claimed in claim 16, wherein the bus system (15) is a DALI bus system which is designed for transmitting data and/or control signals between the central control unit (310) and the electrical ballast (200) in accordance with a DALI protocol.

18. A surge-proof illumination system interface circuit (100) comprising:
 a rectifier circuit (20) which is designed for providing, in dependence on a rectifier input voltage present at rectifier input terminals (20*a*, 20*b*), a rectified rectifier output voltage at rectifier output terminals (20*c*, 20*d*),
 a Darlington circuit (30) having at least two transistors (Q3, Q4), wherein the Darlington circuit has a current path (35) on the output side, controllable in dependence on a drive signal (62), wherein the controllable current path (35) on the output side is coupled between the rectifier output terminals (20*c*, 20*d*),
 a current source (40) which is coupled between a first rectifier output terminal (20*c*) and a drive terminal (30*a*) of the Darlington circuit (30), wherein the current source is designed for limiting a drive current of the Darlington circuit, and
 a node (70) which is electrically coupled between the current source (40), the drive terminal (30*a*) of the Darlington circuit (30) and a circuit arrangement (50) for voltage limiting,
 wherein the node is also coupled to an optocoupler (Q5) for receiving the drive signal (62) and the optocoupler (Q5) is coupled to a drive terminal (30*a*) of the Darlington circuit (30), or the circuit arrangement (50) for voltage limiting comprises a light-emitting diode (LED) of an optocoupler which is designed for exciting a photoreceiver of the optocoupler on the basis of the signals present at the rectifier input terminals (20*a*, 20*b*).

19. A surge-proof illumination system interface circuit (100) comprising:
 a rectifier circuit (20) which is designed for providing, in dependence on a rectifier input voltage present at rectifier input terminals (20*a*, 20*b*), a rectified rectifier output voltage at rectifier output terminals (20*c*, 20*d*),
 a Darlington circuit (30) having at least two transistors (Q3, Q4), wherein the Darlington circuit has a current path (35) on the output side, controllable in dependence on a drive signal (62), wherein the controllable current path (35) on the output side is coupled between the rectifier output terminals (20*c*, 20*d*), and
 a current source (40) which is coupled between a first rectifier output terminal (20*c*) and a drive terminal (30*a*) of the Darlington circuit (30), wherein the current source is designed for limiting a drive current of the Darlington circuit, and wherein the circuit arrangement (50) has a Zener diode (Z3) arranged in the reverse direction.

* * * * *